United States Patent
Hamajima et al.

(10) Patent No.: US 12,065,776 B2
(45) Date of Patent: Aug. 20, 2024

(54) SIZING AGENT FOR INORGANIC FIBER, INORGANIC FIBER AND PRODUCTION METHOD THEREFOR, AND COMPOSITE MATERIAL

(71) Applicant: TAKEMOTO YUSHI KABUSHIKI KAISHA, Gamagori (JP)

(72) Inventors: Satoru Hamajima, Gamagori (JP); Jun Ito, Gamagori (JP); Keiichiro Oshima, Gamagori (JP)

(73) Assignee: TAKEMOTO YUSHI KABUSHIKI KAISHA, Gamagori (JP)

( * ) Notice: Subject to any disclaimer, the term of this patent is extended or adjusted under 35 U.S.C. 154(b) by 0 days.

(21) Appl. No.: 18/257,624

(22) PCT Filed: Dec. 17, 2021

(86) PCT No.: PCT/JP2021/046774
§ 371 (c)(1),
(2) Date: Jun. 15, 2023

(87) PCT Pub. No.: WO2022/138497
PCT Pub. Date: Jun. 30, 2022

(65) Prior Publication Data
US 2023/0399794 A1    Dec. 14, 2023

(30) Foreign Application Priority Data

Dec. 21, 2020 (JP) ................ 2020-211806

(51) Int. Cl.
| | |
|---|---|
| *D06M 11/74* | (2006.01) |
| *C08J 5/08* | (2006.01) |
| *D06M 101/40* | (2006.01) |

(52) U.S. Cl.
CPC .............. *D06M 11/74* (2013.01); *C08J 5/08* (2013.01); *C08J 2363/00* (2013.01); *D06M 2101/40* (2013.01); *D06M 2200/40* (2013.01)

(58) Field of Classification Search
CPC ............ D06M 11/74; D06M 2101/40; D06M 2200/40; C08J 5/08; C08J 2363/00
(Continued)

(56) References Cited

U.S. PATENT DOCUMENTS

| | | |
|---|---|---|
| 2009/0176112 A1 | 7/2009 | Kruckenberg et al. |
| 2011/0001086 A1 | 1/2011 | Kruckenberg et al. |

(Continued)

FOREIGN PATENT DOCUMENTS

| | | | |
|---|---|---|---|
| CN | 104120605 | * | 10/2014 |
| CN | 106930094 | * | 7/2017 |

(Continued)

OTHER PUBLICATIONS

Office Action in China Patent Application No. 202180077859.0, Date of Mailing Sep. 13, 2023, 11 pages.
(Continued)

*Primary Examiner* — Camie S Thompson
(74) *Attorney, Agent, or Firm* — CANTOR COLBURN LLP (57) ABSTRACT

An inorganic fiber sizing agent that contains at least one carbon nanostructure selected from the group consisting of carbon nanotubes and carbon nanofibers, a resin, and a surfactant. If the total content of a nonvolatile content of the resin and the surfactant is taken as 100 parts by mass, the inorganic fiber sizing agent contains the surfactant at a ratio of 2 to 50 parts by mass.

12 Claims, 1 Drawing Sheet

(58) Field of Classification Search
USPC .......................................................... 428/368
See application file for complete search history.

(56) References Cited

U.S. PATENT DOCUMENTS

| | | |
|---|---|---|
| 2011/0151254 A1 | 6/2011 | Fugetsu et al. |
| 2012/0027944 A1 | 2/2012 | Yu et al. |
| 2014/0227516 A1 | 8/2014 | Hashimoto et al. |
| 2014/0346409 A1 | 11/2014 | Witzel et al. |
| 2015/0035183 A1 | 2/2015 | Yu et al. |
| 2015/0035196 A1 | 2/2015 | Yu et al. |
| 2015/0035197 A1 | 2/2015 | Yu et al. |
| 2015/0037509 A1 | 2/2015 | Yu et al. |
| 2016/0221034 A1 | 8/2016 | Chiu et al. |
| 2020/0399821 A1 | 12/2020 | Yoshioka et al. |

FOREIGN PATENT DOCUMENTS

| | | |
|---|---|---|
| JP | 2003238698 A | 8/2003 |
| JP | 2009535530 A | 1/2009 |
| JP | 2010059561 A | 3/2010 |
| JP | 2010261108 A | 11/2010 |
| JP | 2012522142 A | 9/2012 |
| JP | 2015507100 A | 3/2015 |
| JP | 2017504734 A | 2/2017 |
| WO | 2005028174 A2 | 3/2005 |
| WO | 2009028379 A1 | 3/2009 |
| WO | 2010026937 A1 | 3/2010 |
| WO | 2013058200 A1 | 4/2013 |
| WO | 2019176933 A1 | 9/2019 |

OTHER PUBLICATIONS

Gong X. et al.: Surfactant-Assisted Processing of Carbon Nanotube/Polymer Composites. Chem. Mater. 2000, 12, 4, 1049-1052.
Office Action in Germany Patent Application No. DE 11 2021 005 602.6, Date of Mailing Dec. 13, 2023, 13 pages.
Spindler-Ranta, Sean; Bakis, Charles E.: Carbon nanotube reinforcement of a filament winding resin. In: 47th International SAMPE Symposium, vol. 47, 2002, S. 1775-1787.—ISSN 0891-0138.

* cited by examiner

SIZING AGENT FOR INORGANIC FIBER, INORGANIC FIBER AND PRODUCTION METHOD THEREFOR, AND COMPOSITE MATERIAL

TECHNICAL FIELD

The present invention relates to an inorganic fiber sizing agent that contains a carbon nanostructure and to an inorganic fiber, a method for producing an inorganic fiber, and a composite material.

BACKGROUND ART

Fiber-reinforced thermoplastic resin composite materials are generally known as materials that contain inorganic fibers, such as carbon fibers, and a matrix resin, such as a thermoplastic resin, which is a base material, and used widely in respective fields of, for example, construction materials and transportation equipment. A treatment in which a sizing agent is adhered to the inorganic fibers is performed to improve adhesive property of the interface between the inorganic fibers, such as carbon fibers, and the base material, such as a thermoplastic resin.

For example, a carbon fiber sizing agent that is used for reinforcing a thermoplastic matrix resin is disclosed in Patent Document 1. The carbon fiber sizing agent contains a polymer ingredient having such parameters as a predetermined glass transition point. The mass ratio of the polymer ingredient with respect to the entire nonvolatile content of the sizing agent is within a predetermined range. The polymer ingredient is, for example, an aromatic polyester resin.

CITATION LIST

Patent Literature

Patent Document 1: International Publication No. WO 2013/058200

SUMMARY OF INVENTION

Technical Problem

However, the improvement of adhesive property with respect to the base material by the sizing agent of Patent Document 1 is insufficient.

Solution to Problem

The inventors of the present application thus performed research toward solving the above problem and consequently found that an inorganic fiber sizing agent that contains a carbon nanostructure, such as a carbon nanotube, and a resin is properly suitable.

To solve the above problem and in accordance with one aspect of the present invention, an inorganic fiber sizing agent is provided that contains at least one carbon nanostructure selected from the group consisting of carbon nanotubes and carbon nanofibers, a resin, and a surfactant and characterized in that if the total content of a nonvolatile content of the resin and the surfactant is taken as 100 parts by mass, the inorganic fiber sizing agent contains the surfactant at a ratio of 2 to 50 parts by mass.

In the inorganic fiber sizing agent, the carbon nanostructure may contain carbon nanotubes and the carbon nanotubes may include single-wall carbon nanotubes.

In the inorganic fiber sizing agent, the content of the carbon nanostructure in the nonvolatile content of the resin may be not less than 100 ppm and not more than 50,000 ppm.

In the inorganic fiber sizing agent, the resin may contain at least one selected from the group consisting of an epoxy resin, a vinyl ester resin, a polyamide resin, a polyolefin resin, a polyurethane resin, a polyester resin, a phenoxy resin, a polyimide resin, and a polyimide resin precursor.

The inorganic fiber sizing agent may be applied to a glass fiber or a carbon fiber.

The resin in the inorganic fiber sizing agent may be an epoxy resin and if so, the inorganic fiber sizing agent may be applied to a composite material in which a matrix resin is an epoxy resin and furthermore to an inorganic fiber that constitutes a portion of the composite material.

The resin in the inorganic fiber sizing agent may be at least one selected from the group consisting of a polyamide resin, a polyurethane resin, a polyimide resin, and a polyimide resin precursor and if so, the inorganic fiber sizing agent may be applied to a composite material in which a matrix resin is a polyamide resin and furthermore to an inorganic fiber that constitutes a portion of the composite material.

The resin in the inorganic fiber sizing agent may be a vinyl ester resin and if so, the inorganic fiber sizing agent may be applied to a composite material in which a matrix resin is a vinyl ester resin and furthermore to an inorganic fiber that constitutes a portion of the composite material.

The resin in the inorganic fiber sizing agent may be at least one selected from the group consisting of a polyolefin resin and a phenoxy resin and if so, the inorganic fiber sizing agent may be applied to a composite material in which a matrix resin is a polyolefin resin and furthermore to an inorganic fiber that constitutes a portion of the composite material.

Another aspect of the present invention provides an inorganic fiber to which the inorganic fiber sizing agent is adhered.

Another aspect of the present invention provides a method for producing an inorganic fiber that includes adhering the inorganic fiber sizing agent to an inorganic fiber.

Another aspect of the present invention provides a composite material that contains the inorganic fiber and a matrix resin and is characterized in that the resin in the inorganic fiber sizing agent is an epoxy resin and the matrix resin is an epoxy resin.

Another aspect of the present invention provides a composite material that contains the inorganic fiber and a matrix resin and is characterized in that the resin in the inorganic fiber sizing agent is at least one selected from the group consisting of a polyamide resin, a polyurethane resin, a polyimide resin, and a polyimide resin precursor and the matrix resin is a polyamide resin.

Another aspect of the present invention provides a composite material that contains the inorganic fiber and a matrix resin and is characterized in that the resin in the inorganic fiber sizing agent is a vinyl ester resin and the matrix resin is a vinyl ester resin.

Another aspect of the present invention provides a composite material that contains the inorganic fiber and a matrix resin and is characterized in that the resin in the inorganic fiber sizing agent is at least one selected from the group consisting of a polyolefin resin and a phenoxy resin and the matrix resin is a polyolefin resin.

Advantageous Effects of Invention

The present invention succeeds in improving the adhesive property of an inorganic fiber with respect to a base material in a composite material.

DESCRIPTION OF EMBODIMENTS

First Embodiment

First, a first embodiment that embodies an inorganic fiber sizing agent according to the present invention (also referred to hereinafter as sizing agent) will be described.

Carbon Nanostructure

The sizing agent contains at least one carbon nanostructure selected from among carbon nanotubes and carbon nanofibers and a resin. Carbon nanotubes generally have a cylindrical structure in which a graphene sheet is rolled along the center of the fiber. Carbon nanofibers generally have an obliquely layered structure or a perpendicularly layered structure of graphene sheets with respect to the fiber length direction and with edge surfaces of the graphene sheets exposed at the fiber surfaces.

The carbon nanotubes may be single-wall carbon nanotubes with a single layer or may be multi-wall carbon nanotubes with multiple layers, such as double-wall carbon nanotubes with two layers. Among these, single-wall carbon nanotubes are preferable in the point that the effect, due to the sizing agent, of improving the adhesive property of an inorganic fiber with respect to a base material of a composite material can be increased further.

Although there are carbon nanotubes of zigzag type, armchair type, and chiral type in accordance with differences in geometrical structure of carbon nanosheets, any of these may be used. Carbon nanotubes that have been chemically modified, for example, carboxylic group modified, may be used.

Specific examples of the carbon nanostructure include single-layer carbon nanotubes produced by Nanocyl SA, single-layer carbon nanotubes (tradename: TUBALL) produced by OCSiAl, two-layer carbon nanotubes produced by Nanocyl SA, multi-layer carbon nanotubes produced by Nanocyl SA, carboxylic group modified multi-layer carbon nanotubes produced by Nanocyl SA, and reinforcing carbon nanofibers produced by ALMEDIO Inc. One type of such carbon nanostructures may be used alone or two or more types may be used in combination.

Resin

The resin is selected appropriately from those that are known in accordance with, for example, the application of the inorganic fiber to which the sizing agent is applied. Specific examples of the resin include an epoxy resin, a vinyl ester resin, a polyamide resin, a polyolefin resin, a polyurethane resin, a polycarbonate resin, a polyester resin, a PEEK resin, a fluororesin, a phenoxy resin, a phenol resin, a BMI resin, a polyimide resin, a polyimide resin precursor, and a polyether sulfone resin. Among these, an epoxy resin, a vinyl ester resin, a polyamide resin, a polyolefin resin, a polyurethane resin, a polyester resin, a phenoxy resin, a polyimide resin, and a polyimide resin precursor are preferable.

Even more specific examples of the resin include epoxy resins (produced by Mitsubishi Chemical Corporation; tradenames jER828 and jER1002), a polyurethane resin (produced by DKS Co., Ltd.; tradename Superflex 500M), a modified polypropylene resin (produced by Maruyoshi Chemical Co., Ltd.; tradename MGP-1650), a modified polypropylene resin (produced by TOHO Chemical Industry Co., Ltd.; tradename Hitech P-9018), a modified polyester resin (produced by Toyobo Co., Ltd.; tradename Vylonal MD-1480), a phenoxy resin (produced by NIPPON STEEL Chemical and Material Co., Ltd.; tradename YP-50S), a polyimide resin precursor of 3,3',4,4'-biphenyltetracarboxylic acid anhydride and a diaminodiphenyl ether, a polyamide resin (produced by Toray Industries Inc.; tradename AQ Nylon P-95), a polyester resin of a 2 mole ethylene oxide adduct of bisphenol A and fumaric acid, and a vinyl ester resin of an epoxy resin and methacrylic acid.

If the sizing agent is used in application of applying to an inorganic fiber that constitute a portion of a composite material having a matrix resin as a base material, the type of the resin blended in the sizing agent is preferably selected in consideration of the type of the matrix resin from standpoints of improvement of the adhesive property of the inorganic fiber with respect to the matrix resin and improvement of the recyclability. If the matrix resin is an epoxy resin, the resin in the sizing agent is preferably an epoxy resin. If the matrix resin is a polyamide resin, the resin in the sizing agent is preferably at least one selected from among a polyamide resin, a polyurethane resin, a polyimide resin, and a polyimide resin precursor. If the matrix resin is a vinyl ester resin, the resin in the sizing agent is preferably a vinyl ester resin. If the matrix resin is a polyolefin resin, the resin in the sizing agent is preferably at least one selected from among a polyolefin resin and a phenoxy resin.

In the sizing agent, the content of the carbon nanostructure in a nonvolatile content of the resin is set as appropriate and is preferably not less than 100 ppm and not more than 50,000 ppm. By specifying to be in such range, the effect, due to the sizing agent, of improving the adhesive property of the inorganic fiber with respect to the base material of the composite material can be increased further. The term nonvolatile content as used herein refers to residue after sufficient removal of volatile substances by heat-treating an object for 2 hours at 105° C., that is, to absolutely dry matter.

The ratio of the amount of the carbon nanostructure contained in the sizing agent with respect to the amount of the nonvolatile content of the resin in the sizing agent may be, for example, not less than 220 ppm, not less than 400 ppm, not less than 600 ppm, not less than 700 ppm, not less than 800 ppm, not less than 1,000 ppm, not less than 1,400 ppm, not less than 1,500 ppm, not less than 2,000 ppm, not less than 2,500 ppm, not less than 3,500 ppm, not less than 4,000 ppm, not less than 5,000 ppm, not less than 10,000 ppm, not less than 30,000 ppm, or not less than 48,000 ppm or may be not more than 48,000 ppm, not more than 30,000 ppm, not more than 10,000 ppm, not more than 5,000 ppm, not more than 4,000 ppm, not more than 3,500 ppm, not more than 2,500 ppm, not more than 2,000 ppm, not more than 1,500 ppm, not more than 1,400 ppm, not more than 1,000 ppm, not more than 800 ppm, not more than 700 ppm, not more than 600 ppm, not more than 400 ppm, or not more than 220 ppm.

Surfactant

In one aspect, the sizing agent further contains a surfactant. By blending the surfactant in the sizing agent, the carbon nanostructure is made unlikely to become detached easily from the inorganic fiber after application of the sizing agent, that is, a property of preventing detachment of the carbon nanostructure can be improved. Examples of the surfactant include an anionic surfactant, a cationic surfactant, a nonionic surfactant, and an amphoteric surfactant. One type of such surfactants may be used alone or two or more types may be used in combination.

A known nonionic surfactant can be used as appropriate. Specific examples of the nonionic surfactant include (1) a compound in which an alkylene oxide with 2 to 4 carbon atoms is added to an organic acid, an organic alcohol, an organic amine, and/or an organic amide, for example, an ether type nonionic surfactant, such as polyoxyethylene dialuric acid ester, polyoxyethylene oleic acid ester, polyoxyethylene oleic acid diester, polyoxyethylene octyl ether, polyoxyethylene lauryl ether, polyoxyethylene lauryl ether methyl ether, polyoxyethylene polyoxypropylene lauryl ether, polyoxypropylene lauryl ether methyl ether, polyoxyethylene oleyl ether, polyoxybutylene oleyl ether, polyoxyethylene polyoxypropylene nonyl ether, polyoxypropylene nonyl ether, polyoxyethylene polyoxypropylene octyl ether, ethylene oxide adduct of 2-hexylhexanaol, polyoxyethylene 2-ethyl-1-hexyl ether, polyoxyethylene isononyl ether, polyoxyethylene dodecyl ether, compound with which ethylene oxide is added to secondary dodecyl alcohol, polyoxyethylene tridecyl ether, polyoxyalkylene tetradecyl ether, polyoxyethylene lauryl aminoether, polyoxyethylene lauramide ether, or polyoxyalkylene tristyrenated phenyl ether, (2) a polyoxyalkylene polyhydric alcohol fatty acid ester type nonionic surfactant, such as polyoxyalkylene sorbitan trioleate, polyoxyalkylene coconut oil, polyoxyalkylene castor oil, polyoxyalkylene hydrogenated castor oil, polyoxyalkylene hydrogenated castor oil trioctanoate, or maleic acid ester, stearic acid ester, or oleic acid ester of polyoxyalkylene hydrogenated castor oil, (3) an alkyl amide type nonionic surfactant, such as stearic acid diethanolamide or diethanolamine monolauramide, (4) a polyoxyalkylene fatty acid amide type nonionic surfactant, such as polyoxyethylene diethanolamine monooleylamide, polyoxyethylene laurylamine, or polyoxyethylene beef tallow amine, and (5) an ether-ester compound, such as a copolymer of polyoxyethylene, dimethyl phthalate, and lauryl alcohol.

A known anionic surfactant can be used as appropriate. Specific examples of the anionic surfactant include (1) a phosphoric acid ester salt of an aliphatic alcohol, such as a lauryl phosphoric acid ester salt, a cetyl phosphoric acid ester salt, an octyl phosphoric acid ester salt, an oleyl phosphoric acid ester salt, or a stearyl phosphoric acid ester salt, (2) a phosphoric acid ester salt of an adduct of at least one type of alkylene oxide selected from among ethylene oxide and propylene oxide with an aliphatic alcohol, such as a polyoxyethylene lauryl ether phosphoric acid ester salt, a polyoxyethylene oleyl ether phosphoric acid ester salt, or a polyoxyethylene stearyl ether phosphoric acid ester salt, (3) an aliphatic sulfonic acid salt or an aromatic sulfonic acid salt, such as a lauryl sulfonic acid salt, a myristyl sulfonic acid salt, a cetyl sulfonic acid salt, an oleyl sulfonic acid salt, a stearyl sulfonic acid salt, a tetradecane sulfonic acid salt, a dodecylbenzene sulfonic acid salt, or a secondary alkyl (C13 to 15) sulfonic acid salt, (4) a sulfuric acid ester salt of an aliphatic alcohol, such as a lauryl sulfuric acid ester salt, an oleyl sulfuric acid ester salt, or a stearyl sulfuric acid ester salt, (5) a sulfuric acid ester salt of an adduct of at least one type of alkylene oxide selected from among ethylene oxide and propylene oxide with an aliphatic alcohol, such as a polyoxyethylene lauryl ether sulfuric acid ester salt, a polyoxyalkylene (polyoxyethylene, polyoxypropylene) lauryl ether sulfuric acid ester salt, or a polyoxyethylene oleyl ether sulfuric acid ester salt, (6) a sulfuric acid ester salt of a fatty acid, such as a castor oil fatty acid sulfuric acid ester salt, a sesame oil fatty acid sulfuric acid ester salt, a tall oil fatty acid sulfuric acid ester salt, a soybean oil fatty acid sulfuric acid ester salt, a rapeseed oil fatty acid sulfuric acid ester salt, a palm oil fatty acid sulfuric acid ester salt, a lard fatty acid sulfuric acid ester salt, a beef tallow fatty acid sulfuric acid ester salt, or a whale oil fatty acid sulfuric acid ester salt, (7) a sulfuric acid ester salt of an oil or fat, such as a sulfuric acid ester salt of castor oil, a sulfuric acid ester salt of sesame oil, a sulfuric acid ester salt of tall oil, a sulfuric acid ester salt of soybean oil, a sulfuric acid ester salt of rapeseed oil, a sulfuric acid ester salt of palm oil, a sulfuric acid ester salt of lard, a sulfuric acid ester salt of beef tallow, or a sulfuric acid ester salt of whale oil, (8) a fatty acid salt, such as lauric acid salts, oleic acid salts, stearic acid salts, etc., and (9) a sulfosuccinic acid ester salt of an aliphatic alcohol, such as a dioctyl sulfosuccinic acid salt. Examples of a counterion of the anionic surfactant include a potassium salt, a sodium salt, and other alkali metal salts, an ammonium salt, triethanolamine and other alkanolamine salts.

A known cationic surfactant can be used as appropriate. Specific examples of the cationic surfactant include laurylt­rimethylammonium chloride, cetyltrimethylammonium chloride, stearyltrimethylammonium chloride, behenyltrim­ethylammonium chloride, didecyldimethylammonium chloride, 1,2-dimethylimidazole, and triethanolamine.

A known amphoteric surfactant can be used as appropriate. Specific examples of the amphoteric surfactant include a betaine type amphoteric surfactant.

If the sizing agent contains the surfactant, the content of the carbon nanostructure in a total of the nonvolatile content of the resin and the surfactant is set as appropriate and is preferably not less than 50 ppm and not more than 40,000 ppm. By specifying to be in such range, the effect, due to the sizing agent, of improving the adhesive property of the inorganic fiber with respect to the base material of the composite material can be increased further.

The ratio of the amount of the carbon nanostructure contained in the sizing agent with respect to the total of the amount of the nonvolatile content of the resin and the amount of the surfactant may be, for example, not less than 110 ppm, not less than 240 ppm, not less than 360 ppm, not less than 595 ppm, not less than 700 ppm, not less than 750 ppm, not less than 784 ppm, not less than 950 ppm, not less than 1,400 ppm, not less than 1,470 ppm, not less than 1,750 ppm, not less than 1,900 ppm, not less than 2,100 ppm, not less than 3,000 ppm, not less than 9,500 ppm, or not less than 19,500 ppm or not less than 33,600 ppm or may be not more than 33,600 ppm, not more than 19,500 ppm, not more than 9,500 ppm, not more than 3,000 ppm, not more than 2,100 ppm, not more than 1,900 ppm, not more than 1,750 ppm, not more than 1,470 ppm, not more than 1,400 ppm, not more than 950 ppm, not more than 784 ppm, not more than 750 ppm, not more than 700 ppm, not more than 595 ppm, not more than 360 ppm, not more than 240 ppm, or not more than 110 ppm.

If the total content of the nonvolatile content of the resin and the surfactant is taken as 100 parts by mass, the sizing agent contains the surfactant at a ratio of 2 to 50 parts by mass. This ratio may be, for example, not less than 5 parts by mass, not less than 15 parts by mass, not less than 25 parts by mass, not less than 30 parts by mass, not less than 35 parts by mass, or not less than 40 parts by mass or may be not more than 40 parts by mass, not more than 35 parts by mass, not more than 30 parts by mass, not more than 25 parts by mass, not more than 15 parts by mass, or not more than 5 parts by mass.

Effects such as the following can be obtained by the sizing agent of the present embodiment.

(1-1) The sizing agent of the present embodiment contains at least one carbon nanostructure selected from among carbon nanotubes and carbon nanofibers and a resin. When this sizing agent is adhered to an inorganic fiber, the inorganic fiber can be improved in bundling property and can also be improved in adhesive property with respect to a base material of a composite material. This improvement of adhesive property is considered to be caused by an anchor effect due to forming of unevenness on the surface of the inorganic fiber to which the sizing agent is adhered and by transfer of a portion of the carbon nanostructure to the base material. Also, the property of preventing detachment of the carbon nanostructure from the inorganic fiber can be improved.

Second Embodiment

Next, a second embodiment that embodies a method for producing an inorganic fiber according to the present invention will be described. Matters other than those described below concerning the second embodiment are the same as those of the first embodiment.

The method for producing an inorganic fiber of the present embodiment includes adhering the sizing agent of the first embodiment to a carbon fiber. There is no restriction in particular regarding an adhesion amount (not including solvent) and adhesion is preferably performed such that the adhesion amount is not less than 0.01% by mass and not more than 10% by mass as sizing agent with respect to the inorganic fiber. By specifying to be in such numerical value range, the effect of the bundling property of the inorganic fiber can be improved further.

Inorganic Fiber

The type of an inorganic fiber applicable to the present embodiment is not particularly limited, and example thereof include a glass fiber, a carbon fiber, a ceramic fiber, a metal fiber, a mineral fiber, a rock fiber, and a slag fiber. Among these, a glass fiber and a carbon fiber are preferable from the standpoint that the effects of the present invention can be expressed more effectively. Examples of the type of the carbon fiber include a PAN-based carbon fiber obtained using an acrylic fiber as raw material, a pitch-based carbon fiber obtained using pitch as raw material, a recycled carbon fiber, and a carbon fiber obtained using a polyester fiber, polyethylene resin, phenol resin, cellulose resin, or lignin resin as raw material.

To adhere the sizing agent of the first embodiment to the inorganic fiber, a generally used industrial method can be used. Example thereof includes a roller immersion method, a roller contact method, a spraying method, and a paper-making method. The inorganic fiber to which the sizing agent has been adhered may subsequently be dried using a known method.

By the method for producing an inorganic fiber of the present embodiment, effects such as the following can be obtained in addition to the effects of the first embodiment.

(2-1) The method for producing an inorganic fiber of the present embodiment includes adhering a sizing agent that contains a carbon nanostructure and a resin to a carbon fiber. The property of preventing detachment of the carbon nanostructure from the inorganic fiber can thus be improved. Also, the application of the sizing agent to the inorganic fiber is completed in a single step and therefore efficient, in other words, process efficiency can also be improved.

Third Embodiment

Next, a third embodiment that embodies a composite material according to the present invention will be described. Matters other than those described below concerning the third embodiment are the same as those of the first and second embodiments.

The composite material is obtained by impregnating the inorganic fiber, to which the sizing agent has been adhered by the second embodiment, with a matrix resin as a base material. The form of the inorganic fiber when producing the composite material is not particularly limited, and example thereof include a long fiber form, a short fiber form, and a nonwoven fabric form.

Matrix Resin

The matrix resin is selected appropriately from those that are known in accordance with, for example, the purpose or application of the composite material. Specific examples of the matrix resin include an epoxy resin, a vinyl ester resin, a polyamide resin, a polyolefin resin, a polyurethane resin, a polycarbonate resin, a polyester resin, a PEEK resin, a fluororesin, a phenoxy resin, a phenol resin, a BMI resin, a polyimide resin, a polyimide resin precursor, and a polyether sulfone resin.

The matrix resin may be selected in consideration of the type of the resin contained in the sizing agent from standpoints of, for example, improvement of adhesive property with respect to the inorganic fiber and improvement of recyclability. If the matrix resin is an epoxy resin, the resin in the sizing agent is preferably an epoxy resin. If the matrix resin is a polyamide resin, the resin in the sizing agent is preferably at least one selected from among a polyamide resin, a polyurethane resin, a polyimide resin, and a polyimide resin precursor. If the matrix resin is a vinyl ester resin, the resin in the sizing agent is preferably a vinyl ester resin. If the matrix resin is a polyolefin resin, the resin in the sizing agent is preferably at least one selected from among a polyolefin resin and a phenoxy resin.

By the composite material of the present embodiment, effects such as the following can be obtained.

(3-1) The inorganic fiber contained in the composite material of the present embodiment has a sizing agent, which contains a carbon nanostructure and a resin, adhered thereto in advance. Therefore, by the excellent adhesive property of the inorganic fiber and the matrix resin, a fiber reinforced resin composite material is obtained that is excellent especially in mechanical characteristics and various other characteristics.

The above-described embodiments may be modified as follows. The above-described embodiments and the following modifications can be implemented upon being combined with each other within a range that is not technically inconsistent.

- The sizing agent of the above-described embodiments does not preclude blending of another ingredient such as water or an organic solvent, a smoothing agent, an antioxidant agent, or a preservative agent within a range that does not impair the effects of the present invention from a standpoint of, for example, maintaining the performance of the sizing agent and a standpoint of improving application property with respect to an inorganic fiber.
- The field to which the sizing agent of the above-described embodiments is applied is not particularly limited. For example, it may be applied to a carbon fiber composite material (CFRP) impregnated with a matrix resin, such as a polyimide resin, as well as to a fiber for reinforcing concrete.

EXAMPLES

Examples will now be given below to describe the features and effects of the present invention more specifically, but the present invention is not restricted to these examples.

Experimental Part 1 (Preparation of Sizing Agents)

In preparing a sizing agent of Example 1, zigzag type single-layer carbon nanotubes (A-1) indicated in Table 1 as a carbon nanostructure, an epoxy resin (B) indicated in Table 2 as a resin (B), a random adduct of 30 moles of ethylene oxide and 5 moles of propylene oxide with tristyrenated phenol (C-1) indicated in Table 3 as a surfactant (C) were prepared as raw materials, a mixture obtained by mixing these was heated to 100° C. and made uniform and after then cooling to 70° C. or lower, water was added gradually to prepare an aqueous liquid of the sizing agent of Example 1.

In preparing sizing agents of Examples 2 to 18, Reference Example 19, and Comparative Examples 1 to 4, the carbon nanostructures (A) of Table 1, the resins (B) of Table 2, and, where necessary, the surfactants (C) of Table 3 were prepared as raw materials. Aqueous liquids of the sizing agents were then obtained by preparation methods A to D indicated below.

A: A mixture of respective raw materials was heated to 100° C. and made uniform and after then cooling to 70° C. or lower, water was added gradually to prepare an aqueous liquid of a sizing agent.

B: An aqueous liquid of a sizing agent was obtained by mixing a resin emulsion prepared in advance, a water dispersion of a carbon nanostructure prepared in advance, and a surfactant.

C: An aqueous liquid of a sizing agent was obtained by mixing a resin emulsion prepared in advance and a surfactant.

D: An aqueous liquid of a sizing agent was obtained by adding water gradually to a mixture of a resin and a surfactant.

The type and content of the carbon nanostructure (A), the type and content of the resin (B), and the type and content of the surfactant (C) contained in each aqueous liquid of the sizing agent thus obtained and the preparation method of the sizing agent are respectively indicated in the "Carbon nanostructure (A)" column, the "Resin (B)" column, the "Surfactant (C)" column, and the "Mixing method during production" column of Table 4. The nonvolatile concentration of the resin (B) was measured by the following method. That is, 1 g of sample was dispensed on an aluminum tray, the mass of which was measured in advance, and heat treated at 105° C. for 2 hours, the mass of the absolutely dry matter thus obtained was then measured, and the nonvolatile concentration was calculated by the following formula.

Nonvolatile concentration(% by mass)=(Mass of absolutely dry matter after heat treatment)/(Mass of sample before heat treatment)×100

TABLE 1

| Category | Carbon nanostructure (A) |
| --- | --- |
| A-1 | Zigzag type single-layer carbon nanotubes |
| A-2 | Armchair type single-layer carbon nanotubes |
| A-3 | Chiral type single-layer carbon nanotubes |
| A-4 | Single-layer carbon nanotubes (produced by Nanocyl SA; Aldrich Product No. 755710) |
| A-5 | Single-layer carbon nanotubes SWCNT 80% (produced by OCSiAl; tradename: TUBALL) |
| A-6 | Single-layer carbon nanotubes SWCNT 93% (produced by OCSiAl; tradename: TUBALL) |
| A-7 | Two-layer carbon nanotubes (produced by Nanocyl SA; Aldrich Product No. 755141) |
| A-8 | Multi-layer carbon nanotubes (produced by Nanocyl SA; Aldrich Product No. 755133) |
| A-9 | Carboxylic group modified multi-layer carbon nanotubes (produced by Nanocyl SA; Aldrich Product No. 755125) |
| A-10 | Reinforcing carbon nanofibers (produced by ALMEDIO Inc.) |

TABLE 2

| Category | Resin (B) | Nonvolatile content (% by mass) |
| --- | --- | --- |
| B-1 | Epoxy resin (produced by Mitsubishi Chemical Corporation; tradename: jER828) | 100 |
| B-2 | Epoxy resin (produced by Mitsubishi Chemical Corporation; tradename: jER1002) | 100 |
| B-3 | Polyurethane resin (produced by DKS Co., Ltd.; tradename: Superflex 500M) | 45 |
| B-4 | Modified polypropylene resin (produced by Maruyoshi Chemical Co., Ltd.; tradename: MGP-1650) | 30 |
| B-5 | Modified polypropylene resin (produced by TOHO Chemical Industry Co., Ltd.; tradename: Hitech P-9018) | 35 |
| B-6 | Modified polyester resin (produced by Toyobo Co., Ltd.; tradename: Vylonal MD-1480) | 25 |
| B-7 | Phenoxy resin (produced by NIPPON STEEL Chemical and Material Co., Ltd.; tradename: YP-50S) | 100 |
| B-8 | Polyimide resin precursor of 3,3',4,4'-biphenyltetracarboxylic acid anhydride and a diaminodiphenyl ether | 10 |
| B-9 | Polyamide resin (produced by Toray Industries Inc.; tradename: AQ Nylon P-95) | 50 |
| B-10 | Polyester resin of a 2 mole ethylene oxide adduct of bisphenol A and fumaric acid | 100 |
| B-11 | Vinyl ester resin of an epoxy resin and methacrylic acid | 100 |

TABLE 3

| Category | Surfactant (C) |
|---|---|
| C-1 | Random adduct of 30 moles of ethylene oxide and 5 moles of propylene oxide with tristyrenated phenol |
| C-2 | Compound in which 10 moles of ethylene oxide are added to dodecyl alcohol |
| C-3 | Compound in which 15 moles of ethylene oxide are added to isononyl alcohol |
| C-4 | Compound in which 10 moles of ethylene oxide and 5 moles of propylene oxide are added to tetradecyl alcohol |
| C-5 | Compound in which 7 moles of ethylene oxide are added to secondary dodecyl alcohol |
| C-6 | Sodium dodecyl benzenesulfonate |
| C-7 | 1,2-dimethylimidazole |
| C-8 | Triethanolamine |
| C-9 | Copolymer of polyethylene glycol with an average molecular weight of 2000, dimethyl terephthalate, and lauryl alcohol |

TABLE 4

| | Carbon nanostructure (A) | | Resin (B) | | Surfactant (C) | | Mixing method during production | Inorganic fiber used for adhesive property evaluation |
|---|---|---|---|---|---|---|---|---|
| | Type | Added amount (ppm) *1 | Added amount (ppm) *2 | Type | Parts by mass *3 | Type | Parts by mass | |
| Example 1 | A-1 | 1000 | 700 | B-1 | 70 | C-1 | 30 | A | Carbon fiber |
| Example 2 | A-2 | 4000 | 3000 | B-1 | 40 | C-1 | 25 | A | Carbon fiber |
| | | | | B-2 | 35 | | | | |
| Example 3 | A-3 | 2000 | 1900 | B-3 | 95 | C-2 | 5 | B | Carbon fiber |
| Example 4 | A-4 | 700 | 595 | B-1 | 45 | C-1 | 10 | B | Carbon fiber |
| | | | | B-3 | 40 | C-3 | 5 | | |
| Example 5 | A-5 | 1500 | 1470 | B-4 | 98 | C-4 | 2 | B | Carbon fiber |
| Example 6 | A-6 | 800 | 784 | B-5 | 98 | C-6 | 2 | B | Glass fiber |
| Example 7 | A-5 | 1000 | 950 | B-6 | 95 | C-5 | 5 | B | Carbon fiber |
| Example 8 | A-4 | 500 | 250 | B-1 | 40 | C-1 | 50 | A | Carbon fiber |
| | A-6 | 1000 | 500 | B-7 | 10 | | | | |
| Example 9 | A-3 | 5000 | 3000 | B-8 | 60 | C-7 | 40 | B | Carbon fiber |
| Example 10 | A-4 | 10000 | 9500 | B-9 | 95 | C-8 | 5 | B | Carbon fiber |
| Example 11 | A-5 | 2500 | 1750 | B-1 | 30 | C-1 | 28 | A | Carbon fiber |
| | | | | B-10 | 40 | C-9 | 2 | | |
| Example 12 | A-3 | 220 | 110 | B-8 | 50 | C-7 | 50 | B | Carbon fiber |
| Example 13 | A-5 | 48000 | 33600 | B-1 | 40 | C-1 | 30 | A | Glass fiber |
| | | | | B-10 | 30 | | | | |
| Example 14 | A-6 | 600 | 360 | B-11 | 60 | C-1 | 40 | A | Carbon fiber |
| Example 15 | A-7 | 400 | 240 | B-11 | 60 | C-1 | 40 | A | Glass fiber |
| Example 16 | A-8 | 3500 | 2100 | B-1 | 20 | C-1 | 40 | A | Glass fiber |
| | | | | B-10 | 40 | | | | |
| Example 17 | A-9 | 30000 | 19500 | B-11 | 65 | C-1 | 35 | A | Carbon fiber |
| Example 18 | A-10 | 400 | 240 | B-11 | 60 | C-1 | 40 | A | Carbon fiber |
| Reference example 19 | A-3 | 1400 | 1400 | B-4 | 100 | | | B | Carbon fiber |
| Comparative example 1 | | | | B-6 | 95 | C-5 | 5 | C | Carbon fiber |
| Comparative example 2 | | | | B-3 | 90 | C-3 | 10 | C | Carbon fiber |
| Comparative example 3 | | | | B-5 | 98 | C-6 | 2 | C | Glass fiber |
| Comparative example 4 | | | | B-11 | 65 | C-1 | 35 | D | Carbon fiber |

| | Matrix resin used for adhesive property evaluation | Evaluation | | | |
|---|---|---|---|---|---|
| | | Adhesive property | Property of preventing detachment | Process efficiency | Bundling property |
| Example 1 | Epoxy resin | ∘∘ | ∘∘ | ∘ | ∘ |
| Example 2 | Epoxy resin | ∘∘ | ∘∘ | ∘ | ∘ |
| Example 3 | Polyamide resin | ∘∘ | ∘∘ | ∘ | ∘ |
| Example 4 | Epoxy resin | ∘∘ | ∘∘ | ∘ | ∘ |
| Example 5 | Polypropylene resin | ∘∘ | ∘∘ | ∘ | ∘ |
| Example 6 | Polypropylene resin | ∘∘ | ∘∘ | ∘ | ∘ |
| Example 7 | Epoxy resin | ∘∘ | ∘∘ | ∘ | ∘ |
| Example 8 | Epoxy resin | ∘∘ | ∘∘ | ∘ | ∘ |
| Example 9 | Polyamide resin | ∘∘ | ∘∘ | ∘ | ∘ |
| Example 10 | Polyamide resin | ∘∘ | ∘∘ | ∘ | ∘ |
| Example 11 | Epoxy resin | ∘∘ | ∘∘ | ∘ | ∘ |
| Example 12 | Polyamide resin | ∘∘ | ∘∘ | ∘ | ∘ |

TABLE 4-continued

| | | | | | |
|---|---|---|---|---|---|
| Example 13 | Epoxy resin | ○○ | ○○ | ○ | ○ |
| Example 14 | Vinyl ester resin | ○○ | ○○ | ○ | ○ |
| Example 15 | Vinyl ester resin | ○ | ○○ | ○ | ○ |
| Example 16 | Epoxy resin | ○ | ○○ | ○ | ○ |
| Example 17 | Vinyl ester resin | ○ | ○○ | ○ | ○ |
| Example 18 | Vinyl ester resin | ○ | ○○ | ○ | ○ |
| Reference example 19 | Polypropylene resin | ○ | ○ | ○ | ○ |
| Comparative example 1 | Epoxy resin | x | ○○ | ○ | ○ |
| Comparative example 2 | Polyamide resin | x | ○○ | ○ | ○ |
| Comparative example 3 | Polypropylene resin | x | ○○ | ○ | ○ |
| Comparative example 4 | Vinyl ester resin | x | ○○ | ○ | ○ |

Details of the resins indicated in the "Matrix resin used for adhesive property evaluation" column in Table 4 and meanings expressed by "*1," "*2," and "*3" in Table 4 are as follows.

Matrix Resin Used For Adhesive Property Evaluation

Epoxy resin: produced by Mitsubishi Chemical Corporation; tradename: jER828+triethylenetetramine
Vinyl ester resin: produced by Showa Denko K. K.; tradename: Ripoxy R-804B (uses methyl ethyl ketone peroxide curing agent produced by same company)
Polyamide resin: produced by UBE Corporation; UBE Nylon; 1011FB
Polypropylene resin: 2% by mass maleic anhydride modified polypropylene
*1) Content ratio with respect to the nonvolatile content of resin (B)
*2) Content ratio with respect to the total of the nonvolatile content of resin (B) and the surfactant
*3) Nonvolatile content based Experimental Part 2 (Evaluation)

Evaluation of Adhesive Property

Figure 1:
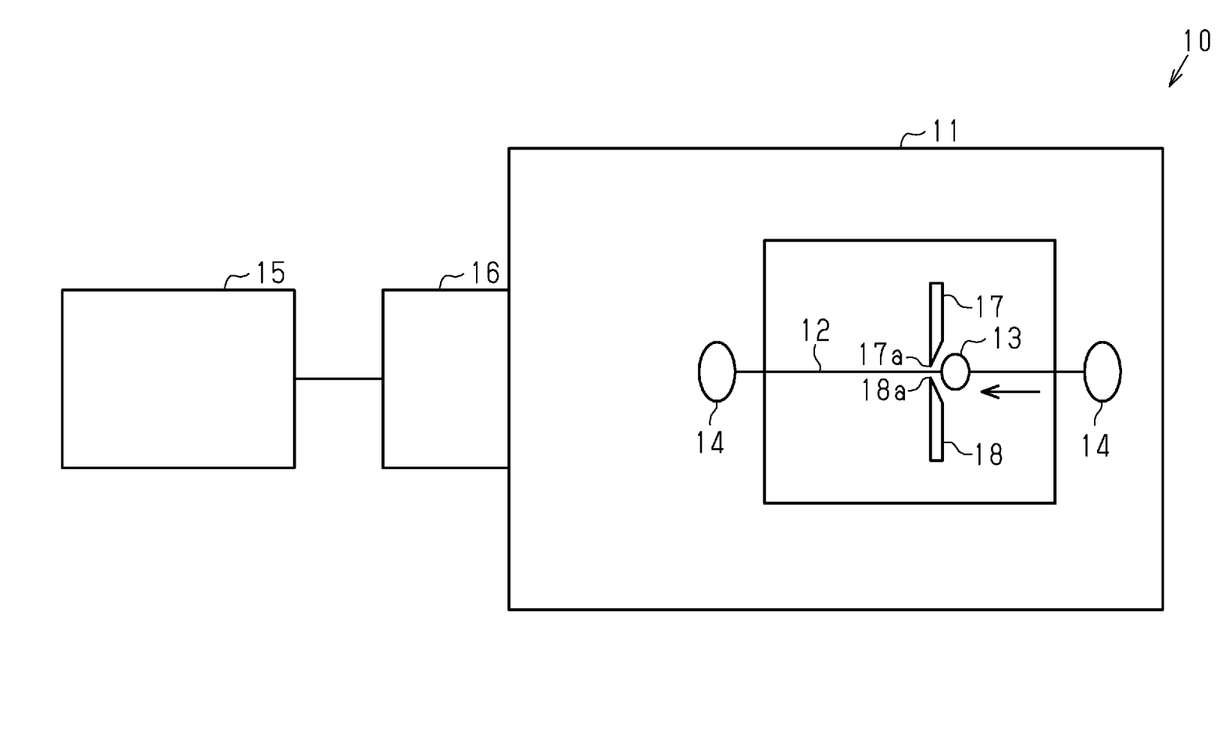
FIG. 1 is a schematic view of a composite material interface characteristic evaluation device for adhesive property evaluation in the Examples sections.

The adhesive property was evaluated by stress measured by a microdroplet method using a commercially available composite material interface characteristic evaluation device. FIG. 1 shows a schematic view of the composite material interface characteristic evaluation device 10.

The aqueous solution of each examples prepared as described above was further diluted with water to prepare an aqueous liquid with a solid content of 2% by mass. The aqueous liquid was supplied by a spraying method to a carbon fiber nonwoven fabric or a glass fiber nonwoven fabric such as to apply 2% by mass as solid content to thereby prepare a carbon fiber nonwoven fabric or a glass fiber nonwoven fabric with the sizing agent of each example applied.

Next, a single carbon fiber or glass fiber was taken out from the carbon fiber nonwoven fabric or the glass fiber nonwoven fabric and this fiber 12 was fixed in a tensioned state at both of its ends by an adhesive 14 onto a holder 11 of quadrilateral frame shape. Next, the matrix resin of each example shown in Table 4 was adhered and fixed to the fiber 12 such as to be a resin drop 13 of approximately 70 µm diameter.

In a device main body that is unillustrated, two plate-shaped blades 17 and 18, each with a vertical cross-section formed to a tapered shape at one side surface, are mounted in a positional state such that tip portions 17a and 18a thereof face each other. At a position such that the fiber 12, with the resin drop 13 fixed thereto, is sandwiched by the tip portions 17a and 18a of the two blades 17 and 18, the holder 11 was mounted to a base plate 16, which is fixed to the device main body. The base plate 16 is connected to a load cell 15 and stress loaded onto the base plate 16 is measured.

A maximum stress F generated when the resin drop 13 is peeled off from the fiber 12 by the tip portions 17a and 18a of the blades 17 and 18 as the holder 11 is moved in a fiber axis direction at a speed of 5 mm/minute was measured by the load cell 15.

Using the measured value, an interface shear strength τ was calculated by a Numerical Formula 1 shown below. The same operation was performed 20 times and an average value of the interface shear strengths obtained was determined. Further, for the average value obtained, an increase rate with respect to a reference numerical value indicated below for the matrix resin used was determined and evaluated based on the following criteria. The results are indicated in the "Adhesive property" column of Table 4. Also, the types of inorganic fiber and the types of matrix resin used are respectively indicated in the "Inorganic fiber used for adhesive property evaluation" column and the "Matrix resin used for adhesive property evaluation" column of Table 4.

$$\tau = F/\pi DL \qquad \text{[Numerical Formula 1]}$$

In Numerical Formula 1,
F is the maximum stress (N) generated when the resin drop 13 is peeled off from the fiber 12,
D is the diameter (m) of the fiber 12, and
L is the diameter (m) of the resin drop 13 in a pulling-off direction.
Reference values of the matrix resins used
Epoxy resin: 60 MPa
Vinyl ester resin: 40 MPa
Polyamide resin: 50 MPa
Polypropylene resin: 22 MPa
Evaluation Criteria of Adhesive Property
○ ○ (satisfactory): The increase rate is not less than 12%.
○ (fair): The increase rate is not less than 1% but less than 12%.
x (poor): The increase rate is less than 1%.
Evaluation of Property of Preventing Detachment Whether or not the carbon nanostructure became detached from the inorganic fiber after passing the inorganic fiber through a sizing bath for applying the sizing agent was observed at a metal roller portion after undergoing a drying step and the property of preventing detachment was evaluated based on the following criteria. The results are indicated in the "Property of preventing detachment" column of Table 4.

- ⊚ (satisfactory): Detachment of the carbon nanostructure was not seen on the metal roller and continuous operation for two weeks or more was possible.
- ○ (fair): Although slight detachment of the carbon nanostructure was seen on the metal roller and continuous operation for two weeks or more was possible.
- x (poor): Much detachment of the carbon nanostructure was seen on the metal roller and production needed to be stopped to perform cleaning in less than two weeks.

Evaluation of Process Efficiency

The process efficiency was evaluated based on the following criteria. The results are indicated in the "Process efficiency" column of Table 4.
- ○ (satisfactory): Application of the carbon nanostructure and the resin is completed in one stage.
- x (poor): There are the two-stage steps of applying the carbon nanostructure and applying the sizing agent containing the resin thereafter.

Evaluation of Bundling Property

The aqueous solution of each example prepared as described above was further diluted with water to prepare an aqueous liquid with a solid content of 2% by mass. Unsized carbon fiber strands obtained from polyacrylonitrile fibers were immersed continuously in the above aqueous liquid. The aqueous liquid was adhered to the carbon fiber strands with a wringing condition of a roller being adjusted such that the adhered amount (not including solvent) of the sizing agent with respect to the carbon fibers is fixed at 1% by mass. In succession, drying by continuous passage through an oven of 200° C. for 1 minute and then take-up by a metal roller were performed.

Conditions of the carbon fiber strands after immersion in the aqueous solution to apply the sizing agent was observed at the metal roller portion after undergoing the drying step and the bundling property was evaluated based on the following criteria. The results are indicated in the "Bundling property" column of Table 4.
- ○ (satisfactory): The carbon fiber strands passed through the metal roller in a well-bundled state and there were no problems in workability.
- x (poor): The carbon fiber strands were not well bundled and entanglement around the metal roller occurred.

As is clear from the results in Table 4 above, the present invention succeeds in obtaining a sizing agent that is excellent in the effect of improving the adhesive property of an inorganic fiber with respect to a base material of a composite material. Also, the present invention is excellent in terms of the property of preventing detachment, process efficiency, and bundling property as well.

The present disclosure also encompasses the following embodiments.

Additional Embodiment 1

An inorganic fiber sizing agent comprising at least one carbon nanostructure selected from the group consisting of carbon nanotubes and carbon nanofibers and a resin.

Additional Embodiment 2

The inorganic fiber sizing agent according to additional embodiment 1, wherein the carbon nanostructure contains carbon nanotubes and the carbon nanotubes includes single-wall carbon nanotubes.

Additional Embodiment 3

The inorganic fiber sizing agent according to additional embodiment 1 or 2, wherein the content of the carbon nanostructure in the nonvolatile content of the resin is not less than 100 ppm and not more than 50,000 ppm.

Additional Embodiment 4

The inorganic fiber sizing agent according to any one of additional embodiments 1 to 3, wherein the resin contains at least one selected from the group consisting of an epoxy resin, a vinyl ester resin, a polyamide resin, a polyolefin resin, a polyurethane resin, a polyester resin, a phenoxy resin, a polyimide resin, and a polyimide resin precursor.

Additional Embodiment 5

The inorganic fiber sizing agent according to any one of additional embodiments 1 to 4, further comprising a surfactant.

Additional Embodiment 6

The inorganic fiber sizing agent according to any one of additional embodiments 1 to 5, wherein the inorganic fiber sizing agent is applied to a glass fiber or a carbon fiber.

Additional Embodiment 7

The inorganic fiber sizing agent according to any one of additional embodiments 1 to 6, wherein the resin is an epoxy resin, and the inorganic fiber sizing agent is applied to a composite material in which a matrix resin is an epoxy resin.

Additional Embodiment 8

The inorganic fiber sizing agent according to any one of additional embodiments 1 to 6, wherein the resin is at least one selected from the group consisting of a polyamide resin, a polyurethane resin, a polyimide resin, and a polyimide resin precursor, and the inorganic fiber sizing agent is applied to a composite material in which a matrix resin is a polyamide resin.

Additional Embodiment 9

The inorganic fiber sizing agent according to any one of additional embodiments 1 to 6, wherein the resin is a vinyl ester resin, and the inorganic fiber sizing agent is applied to a composite material with which a matrix resin is a vinyl ester resin.

Additional Embodiment 10

The inorganic fiber sizing agent according to any one of additional embodiments 1 to 6, wherein the resin is at least one selected from the group consisting of a polyolefin resin and a phenoxy resin, and the inorganic fiber sizing agent is applied to a composite material in which a matrix resin is a polyolefin resin.

Additional Embodiment 11

An inorganic fiber to which the inorganic fiber sizing agent according to any one of additional embodiments 1 to 6 is adhered.

Additional Embodiment 12

A method for producing an inorganic fiber, comprising adhering the inorganic fiber sizing agent according to any one of additional embodiments 1 to 10 to an inorganic fiber.

Additional Embodiment 13

A composite material comprising the inorganic fiber according to additional embodiments 11 and a matrix resin, wherein the resin in the inorganic fiber sizing agent is an epoxy resin, and the matrix resin is an epoxy resin.

Additional Embodiment 14

A composite material comprising the inorganic fiber according to additional embodiments 11 and a matrix resin, wherein the resin in the inorganic fiber sizing agent is at least one selected from the group consisting of a polyamide resin, a polyurethane resin, a polyimide resin, and a polyimide resin precursor, and the matrix resin is a polyamide resin.

Additional Embodiment 15

A composite material comprising the inorganic fiber according to additional embodiment 11 and a matrix resin, wherein the resin in the inorganic fiber sizing agent is a vinyl ester resin, and the matrix resin is a vinyl ester resin.

Additional Embodiment 16

A composite material comprising the inorganic fiber according to additional embodiment 11 and a matrix resin, wherein the resin in the inorganic fiber sizing agent is at least one selected from the group consisting of a polyolefin resin and a phenoxy resin, and the matrix resin is a polyolefin resin.

REFERENCE SIGNS LIST

10 . . . composite material interface characteristic evaluation device
11 . . . holder
12 . . . fiber
13 . . . resin drop
14 . . . adhesive
15 . . . load cell
16 . . . substrate
17, 18 . . . blade

The invention claimed is:

1. An inorganic fiber sizing agent comprising at least one carbon nanostructure selected from the group consisting of carbon nanotubes and carbon nanofibers, a resin, and a surfactant, wherein
the total content of a nonvolatile content of the resin and the surfactant is taken as 100 parts by mass and the inorganic fiber sizing agent contains the surfactant at a ratio of 2 to 50 parts by mass,
the resin contains at least one selected from the group consisting of a vinyl ester resin, a polyamide resin, a polyolefin resin, a polyurethane resin, a polyester resin, a phenoxy resin, a polyimide resin, and a polyimide resin precursor, and
the surfactant is an ether nonionic surfactant, a polyoxyalkylene polyhydric alcohol fatty acid ester nonionic surfactant, an alkyl amide nonionic surfactant, a polyoxyalkylene fatty acid amide nonionic surfactant or an ether-ester compound.

2. The inorganic fiber sizing agent according to claim 1, wherein the carbon nanostructure contains carbon nanotubes and the carbon nanotubes includes single-wall carbon nanotubes.

3. The inorganic fiber sizing agent according to claim 1, wherein the content of the carbon nanostructure in the nonvolatile content of the resin is not less than 100 ppm and not more than 50,000 ppm.

4. The inorganic fiber sizing agent according to claim 1, wherein the inorganic fiber sizing agent is applied to a glass fiber or a carbon fiber.

5. The inorganic fiber sizing agent according to claim 1, wherein the resin is at least one selected from the group consisting of a polyamide resin, a polyurethane resin, a polyimide resin, and a polyimide resin precursor, and the inorganic fiber sizing agent is applied to a composite material in which a matrix resin is a polyamide resin.

6. The inorganic fiber sizing agent according to claim 1, wherein the resin is a vinyl ester resin, and the inorganic fiber sizing agent is applied to a composite material in which a matrix resin is a vinyl ester resin.

7. The inorganic fiber sizing agent according to claim 1, wherein the resin is at least one selected from the group consisting of a polyolefin resin and a phenoxy resin, and the inorganic fiber sizing agent is applied to a composite material in which a matrix resin is a polyolefin resin.

8. An inorganic fiber to which the inorganic fiber sizing agent according to claim 1 is adhered.

9. A composite material comprising the inorganic fiber according to claim 8 and a matrix resin, wherein the resin in the inorganic fiber sizing agent is at least one selected from the group consisting of a polyamide resin, a polyurethane resin, a polyimide resin, and a polyimide resin precursor, and the matrix resin is a polyamide resin.

10. A composite material comprising the inorganic fiber according to claim 8 and a matrix resin, wherein the resin in the inorganic fiber sizing agent is a vinyl ester resin, and the matrix resin is a vinyl ester resin.

11. A composite material comprising the inorganic fiber according to claim 8 and a matrix resin, wherein the resin in the inorganic fiber sizing agent is at least one selected from the group consisting of a polyolefin resin and a phenoxy resin, and the matrix resin is a polyolefin resin.

12. A method for producing an inorganic fiber, comprising adhering the inorganic fiber sizing agent according to claim 1 to an inorganic fiber.

* * * * *